UNITED STATES PATENT OFFICE.

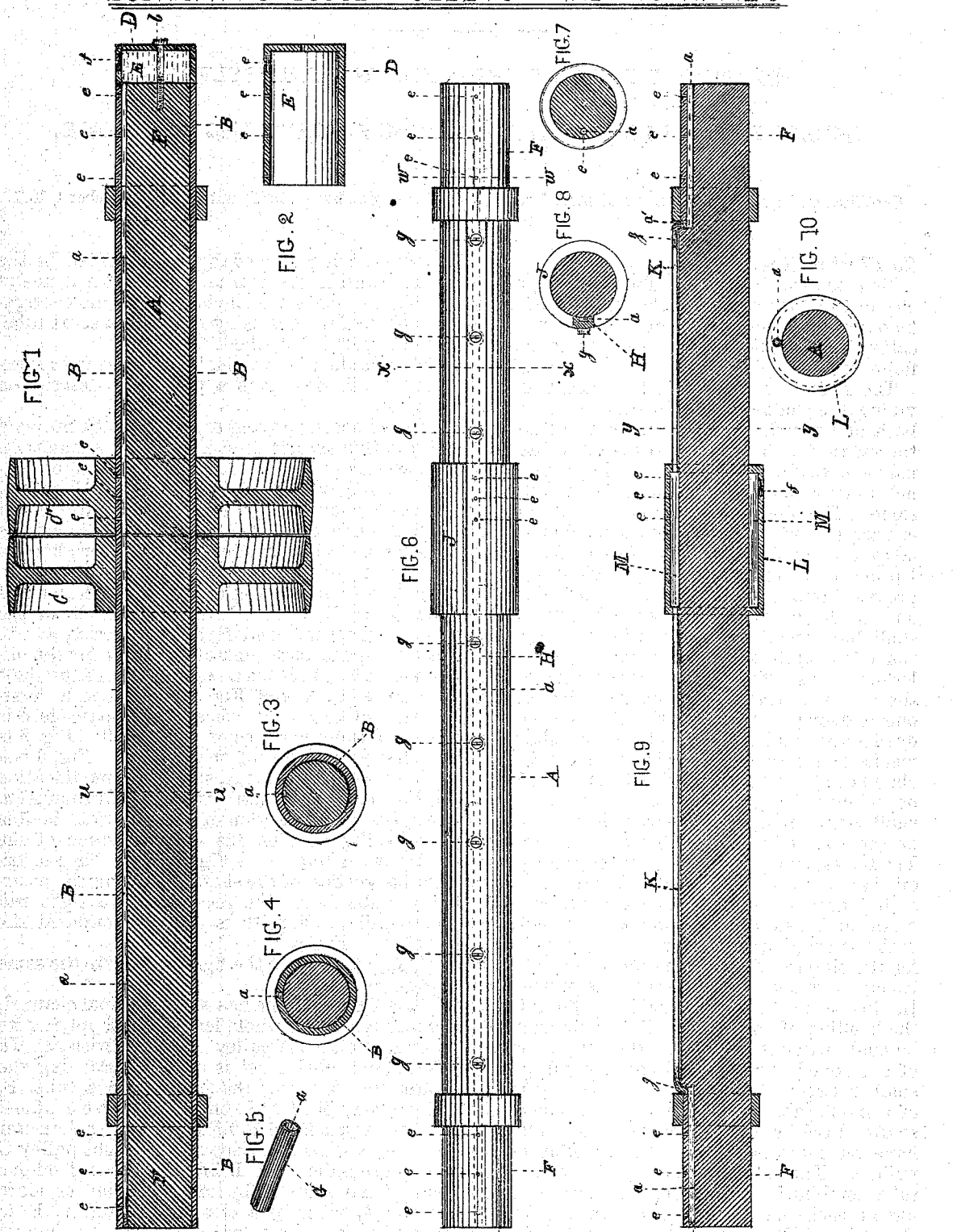

STEPHEN USTICK, OF PHILADELPHIA, PENNSYLVANIA.

IMPROVEMENT IN LUBRICATING LOOSE PULLEYS AND JOURNALS.

Specification forming part of Letters Patent No. 119,065, dated September 19, 1871; antedated September 1, 1871.

*To all whom it may concern:*

Be it known that I, STEPHEN USTICK, of the city of Philadelphia, and State of Pennsylvania, have invented certain Improvements in Lubricating Loose Pulleys and Journals, of which the following is a specification:

The nature of my invention consists in providing the shaft with an oil-chamber on one or both of its ends, and a channel in connection therewith, for the passage of the oil to the journals and to the eyes of loose pulleys, the channel having openings communicating with the same. The oil-channel may be formed in different ways to suit the views of the machinist or in adaptation to circumstances. One plan on which I propose to construct the channel is to run a groove throughout the whole length of the shaft and cover the latter with a metal tube, which shall have small perforations for the transmission of the oil to the journals and the eyes of the loose-pulleys. The oil-chambers on the ends of the shafts I form of cast or other boxes, with one end open. I confine the boxes with their open ends against the ends of the shafts by means of screws or otherwise, forming a closed chamber for the oil. Or else the boxes may be of sufficient length to pass over the ends of the shaft to the collars of the journal, leaving a space at the ends of the shaft for the oil-chambers. The boxes have perforations connecting with the oil-channel for the exit of the oil to the periphery of the journals. The oil-chambers are supplied with oil through a suitable opening, which is provided with a screw-plug. Instead of forming the channel for the oil-passage in the periphery of the shaft it may be made in the internal face of the tube. In this case it can conveniently be done before the bending of the skelp. The oil-channel may be made without the use of the tube by means of a grooved strip confined on the side of the shaft between the journal-collars, or by means of a small tube running along one side of the shaft. In either of the two cases the shaft must have an enlargement for the reception of the pulleys. The enlargement may be made with a tube combined with the shaft by means of collars at each end, so as to form an annular oil-chamber. When the oil-channel is thus formed it may be continued through the journals near one side by means of drilling, the communication between these end channels and the middle channel being formed by holes drilled in the former inside the journal-collars. In a line of shafts I connect the oil-channels in the contiguous ends of the shafts by means of a short tube, as hereinafter described.

To enable others to make and use my invention, I will now give a particular description thereof.

In the accompanying drawing, which makes a part of this specification, Figure 1 is a longitudinal section of a shaft, A, which has a tight pulley, C, and a loose pulley, C', in combination, the said shaft having an oil-box, D, at one end and a connecting-tube, G, at the other end, the oil-channel *a* being formed in the periphery of the shaft and covered by means of the tube B. Fig. 2 is a vertical section of a modified form of the oil-box D, it being long enough to slip on the end of the shaft and form the journal, and to leave a space at the end of the latter for the oil-chamber E. Fig. 3 is a cross-section of the shaft A at the line *u u* of Fig. 1. Fig. 4 is a cross-section of the shaft when the oil-passage *a* is made in the inner face of the tube B. Fig. 5 is a perspective view of the tube G. Fig. 6 is a side view of the shaft A, showing a modification in the mode of constructing the oil-channel *a*. Fig. 7 is a cross-section of the shaft at the line *w w* of Fig. 6. Fig. 8 is a cross-section of the shaft at the line *x x* of Fig. 6. Fig. 9 is a longitudinal section of the shaft A, having the encircling tube L for the reception of a tight and loose pulley. Fig. 10 is a cross-section at the line *y y* of Fig. 9.

Like letters in all the figures indicate the same parts.

A is a shaft, which has a longitudinal channel, *a*, throughout its whole length for supplying its journals and loose pulley or pulleys with oil. In Fig. 1 the oil-channel is made by grooving the shaft and covering the latter with a tube, B, which may be shrunk on or otherwise confined and then turned off to form the proper diameter for the journals and seats for the tight pulley C and loose pulley C'. D is a box secured on one end of the shaft A by means of one or more screws, *b*, whereby a closed oil-chamber, E, is formed to keep up a supply of oil to the channel *a*. The tube has perforations *e* in connection with the channel *a*, through which oil passes in sufficient quantities for lubricating the journals F of the shaft and the eye of the loose pulley D'. The oil-box D has an opening in its side for filling it with oil, the opening being closed by means of a screw-plug, f. When the opposite end of the shaft A is not provided with an oil-box, D, the oil-channel at that point is closed to prevent the outflow of oil. In Fig. 2 is shown a modification of the oil-box D, the box being made long enough to slip on the end of the shaft and form the journal, and also a space between the end of the journal and the head of the box to form the oil-chamber E. Fig. 3 represents a cross-section of the shaft A when the oil-channel a is formed by means of a groove in the shaft. The channel may be made, however, by making the groove in the inner surface of the tube B, as represented by the cross-section in Fig. 4. The groove can be made most conveniently before the skelp is bent. I continue the oil-channel a throughout a line of shafts by means of short tubes G, which are placed in the oil-channels in the contiguous ends of the shafts. One of these tubes is shown on an enlarged scale in Fig. 5. In Fig. 6 a modification is shown in the mode of forming the oil-channel a. The channel is formed between the journals by confining the strip H with its grooved side against the surface of the shaft by means of screws g, clearly shown in the cross-section of the shaft in Fig. 7. The shaft has an enlargement, J, for the reception of the tight and loose pulleys, through which a groove is made for the reception of the grooved strip H. Fig. 8 is a cross-section of the shaft at the line x x of Fig. 6. The oil-channel a may also be formed outside of the shaft in the manner shown in Fig. 9 by means of a tube, K, which passes through one side of the enlargement for the reception of the pulley. This enlargement, as shown in the drawing, is formed by means of the tube L, which is large enough in its inside to form a space, M, around the shaft for an oil-chamber, the tube being closed at the ends between it and the periphery of the shaft A. The oil-chamber or space M is essentially the same as shown in my application of lubricating loose pulleys now in the Patent Office, and for which a patent has been allowed. A cross-section of the shaft in front of the enlargement at the line y y is shown in Fig. 10. When the oil-channel is made on the outside of the shaft between the journals, as represented in Figs. 6 and 9, I usually extend it to the ends of the shaft by drilling holes a at one side of the journals and cross-hole a' to meet them inside of the journal-collars, as seen in Fig. 9, and connect the bent ends of the tube K with the said cross-openings a'. When the channel a has communication with an oil-chamber, M, as shown in Fig. 9, the oil-boxes D on the ends of the shaft A may be dispensed with, if desired, by closing the outer ends of the channel a and providing the tube L outside of one of the pulleys with an opening for filling the chamber M with oil, the opening being closed by means of a screw-plug or other device. I fill the cross-openings a' with cotton or other fibrous material g to convey the oil to the end channels a by capillary attraction. This is necessary, as without such provision the centrifugal force of the shaft would prevent the oil passing inward to the channels.

What I claim as my invention, and desire to secure by Letters Patent, is—

1. A closed longitudinal oil-channel at one side of the shaft A, communicating with the journal and loose pulley or pulleys by means of suitable outlets, and with the box D or other oil-reservoir, substantially as described.

2. The combination of the tube B with the shaft A, when the oil-channel a is formed in the surface of the shaft or the inner surface of the tube, substantially as set forth.

3. The combination of the connecting-tube or tubes G with oil-channels a, as and for the purpose specified.

4. The arrangement of the fibrous material g in the cross-openings a' to convey the oil at those points to the end channels a, substantially as described.

5. The combination of an oil-box, D, with one or both ends of the shaft A, when its inner end forms the journal, as represented in Fig. 2, substantially as above set forth.

In testimony that the above is my invention I have hereunto set my hand and affixed my seal this 21st day of September, 1870.

STEPHEN USTICK. [L. S.]

Witnesses:
 THOMAS J. BEWLEY.
 H. ASHTON HENRY.